United States Patent [19]

Ott

[11] 3,997,319
[45] * Dec. 14, 1976

[54] FERTILIZING METHOD

[75] Inventor: Louis E. Ott, St. John, Ind.

[73] Assignee: Standard Oil Company, Chicago, Ill.

[*] Notice: The portion of the term of this patent subsequent to Dec. 17, 1991, has been disclaimed.

[22] Filed: Sept. 30, 1974

[21] Appl. No.: 510,168

Related U.S. Application Data

[63] Continuation of Ser. No. 399,291, Sept. 21, 1973, which is a continuation of Ser. No. 198,962, Nov. 15, 1971, abandoned.

[52] U.S. Cl. .................................. 71/27; 71/64 C; 71/1; 71/54
[51] Int. Cl.$^2$ .......................................... C05D 9/02
[58] Field of Search ................. 71/1, 64 C, 54, 59, 71/58, 27

[56] References Cited

UNITED STATES PATENTS 2,086,717  7/1937  Kniskern .............................. 71/1 X
2,957,762  10/1960  Young ................................. 71/59
3,647,411  3/1972  Stevens ................................. 71/1
3,854,923  12/1974  Ott ........................................ 71/1

FOREIGN PATENTS OR APPLICATIONS 609,807  10/1948  United Kingdom .................. 71/54

OTHER PUBLICATIONS

Vogel, A. L. Qualitative Chemical Analysis, 3rd Ed., London, Longmens, Green & Co., 1945, pp. 32–37.

Primary Examiner—Frank A. Spear, Jr.
Assistant Examiner—Ferris H. Lander
Attorney, Agent, or Firm—Werten F. W. Bellamy; Arthur G. Gilkes; William T. McClain

[57] ABSTRACT

Supply of zinc and nitrogen plant nutrients to plants growing in soil is effected by applying to the soil substantially anhydrous liquid ammonia containing an ionic solution of a zinc carboxylate.

5 Claims, No Drawings

FERTILIZING METHOD

CROSS-REFERENCE TO RELATED APPLICATIONS

This application is a continuation of my copending application U.S. Ser. No. 399,291, filed Sept. 21, 1973, which in turn is a continuation of Ser. No. 198,962, filed Nov. 15, 1971, now abandoned.

BACKGROUND OF THE INVENTION

1. Field Of The Invention

This invention relates to liquid fertilizers. More particularly, it relates to a method of fertilizing agricultural soils to provide zinc and nitrogen plant nutrients to plants growing in the soil.

2. Description Of Prior Art

Substantially anhydrous liquid ammonia is used in conventional fertilization programs as the primary source of nitrogen for the growing plants. Zinc is an essential element in plant nutrition, and a deficiency thereof in the soil is a common cause of poor plant growth. Accordingly, it is desirable to simultaneously apply both ammonia and zinc to the soil so that any zinc deficiencies in the soil may be overcome and whereby the zinc so applied is uniformly distributed throughout the soil.

Zinc oxide, a substantially water-insoluble solid, is the most economical source of zinc for agricultural purposes. However, since it is insoluble in anhydrous and aqua ammonia, it has not been possible to effectively utilize this low cost source of zinc in liquid plant nutrient compositions.

Surprisingly, the zincammine acetate solution of this invention can be infinitely diluted at ambient temperatures with agricultural grade anhydrous ammonia to give solutions for fertilizing purposes. This represents a distinct and unexpected advantage in using the liquid ammonia-zinc carboxylate composition of this invention because of the greater solubility of zinc acetate in anhydrous ammonia as compared to zinc sulfate.

SUMMARY OF THE INVENTION

It has been discovered that a liquid solution consisting essentially of an ionic solution of a zinc alkanoate in substantially anhydrous liquid ammonia can be used as a liquid fertilizer to provide nutrient amounts of nitrogen and zinc for the growing plants.

The zinc carboxylates suitable for use in the present invention are the zinc salts of unsubstituted alkanoic acids having the formula R COOH wherein R is hydrogen or alkyl, preferably $C_{1-5}$ alkyl and most preferably $C_1$ alkyl.

The term "zinc carboxylate" as used herein refers to the zinc salt of formic or an unsubstituted saturated aliphatic monocarboxylic acid that is capable of reacting with ammonia and being soluble in ammonia. The zinc salts of formic, acetic, propionic, butanoic, pentanoic and hexanoic acids are suitable for forming the compositions of this invention. Zinc acetate is especially preferred because of its ready availability or ease of formation from zinc oxide and acetic acid. It is to be understood that the zinc carboxylate does not exist per se in the ammonia but is present as an ionic solution.

Preparation of the nitrogen-zinc solutions used in the fertilizing method of this invention is obtained by simply dissolving the zinc carboxylate, in amounts sufficient to provide the desired amount of zinc, directly in the liquid ammonia; or by first forming an aqueous ammoniacal solution of the zinc carboxylate and adding this solution to the liquid ammonia.

The term "substantially anhydrous liquid ammonia" means liquid ammonia containing up to about 2 wt. % water.

The liquid zinc-nitrogen solutions may contain from about 0.01 to about 20, preferably 0.025 to 10, wt. % zinc. The amount of zinc in the solution will depend upon the dosage rate of both the nitrogen and zinc that is to be applied to the soil.

EXAMPLE I

Commercial anhydrous (liquid) ammonia, which contained about 0.5% water, solutions containing 0.05, 0.1, 0.2 and 0.4 wt. % zinc were formed by dissolving zinc acetate dihydrate salt therein. The amounts of salt used per ton of ammonia, to provide said zinc concentrations, were 3.45, 6.9, 13.8 and 27.6 pounds, which amounts correspond to 1, 2, 4 and 8 pounds of zinc per ton of ammonia. Results of field tests using these zinc-containing solutions and zinc-free liquid ammonia as fertilizers for corn by pre-planting applications in soils classified as zinc-sufficient, and by side-dressing application in zinc-deficient soils are:

| Sample | Wt. % Zinc in Ammonia | Pre-Plant Rate* | Pre-Plant Yield** | Side Dressing Rate* | Side Dressing Yield** |
|---|---|---|---|---|---|
| 1 | 0 | 210 | 97 | 140 | 98.8 |
| 2 | 0.05 | 200 | 99 | 150 | 103.4 |
| 3 | 0.1 | 180 | 99 | 140 | 104.7 |
| 4 | 0.2 | 200 | 103 | 140 | 121.4 |
| 5 | 0.4 | 200 | 106 | 140 | 116.8 |

*pounds of ammonia applied per acre
**bushels per acre of No. 2 Corn

These data show that zinc, when applied as a solution in liquid ammonia, is readily assimilated by the plants and provides an improvement in utilization of the plant nutrients applied to the soil.

EXAMPLE II

A solution formed by combining 35 parts ammonium hydroxide (29% ammonia) and 43 parts of solid ammonium acetate had a temperature of 38° F. To this solution was added, with stirring, 22 parts zinc oxide which was completely dissolved within 45 minutes to form a product solution containing 17.5 wt. % zinc.

The concentrate of this example was injected into a flowing liquid ammonia stream being transferred from ammonia storage tank to a transport tank. The amount of concentrate injected was sufficient to provide 0.05 wt. % zinc in the liquid ammonia which was then applied to ten different fields of 10 or more acres in the normal manner with conventional liquid ammonia applicator equipment at about 150 – 200 pounds per acre of ammonia for providing the requisite nitrogen for growing corn.

At the same time, liquid ammonia without zinc was applied at the same test locations at the same rate. Quite unexpectedly, a yield advantage of about 8 bushels per acre of No. 2 corn was obtained at eight of the test plots in favor of the ammonia/zinc combination versus ammonia only. At the other two locations, no significant difference in yield was noted.

The present invention thus provides a simple and effective means for providing readily assimilable zinc for growing plants on both zinc sufficient and zinc deficient soils and thereby improve crop yields.

I CLAIM:

1. The method of fertilizing agricultural soil for supplying zinc and nitrogen plant nutrients to plants growing in the soil which consists of applying a liquid ionic solution of ammonia and zinc below the surface of the soil, said solution consisting essentially of a zinc carboxylate containing 1 to 5 carbon atoms from about 0.01 to about 20 weight percent zinc and substantially anhydrous liquid ammonia.

2. The method of claim 1 wherein said zinc carboxylate contains 1 to 5 carbon atoms.

3. The method of claim 1 wherein said zinc carboxylate is selected from the group consisting of zinc formate, zinc acetate, zinc propionate and zinc butanoate.

4. The method of claim 1 wherein said zinc carboxylate is zinc acetate.

5. The method of claim 1 wherein the weight percent for zinc is from about 0.025 to 10.

* * * * *